July 28, 1936.  R. THOMPSON  2,048,959
POWER PLANT MOUNTING FOR VEHICLES
Filed March 8, 1935   3 Sheets-Sheet 1

INVENTOR.
RICHARD THOMPSON
BY
Munn, Anderson & Liddy
ATTORNEYS.

July 28, 1936.  R. THOMPSON  2,048,959
POWER PLANT MOUNTING FOR VEHICLES
Filed March 8, 1935  3 Sheets-Sheet 3
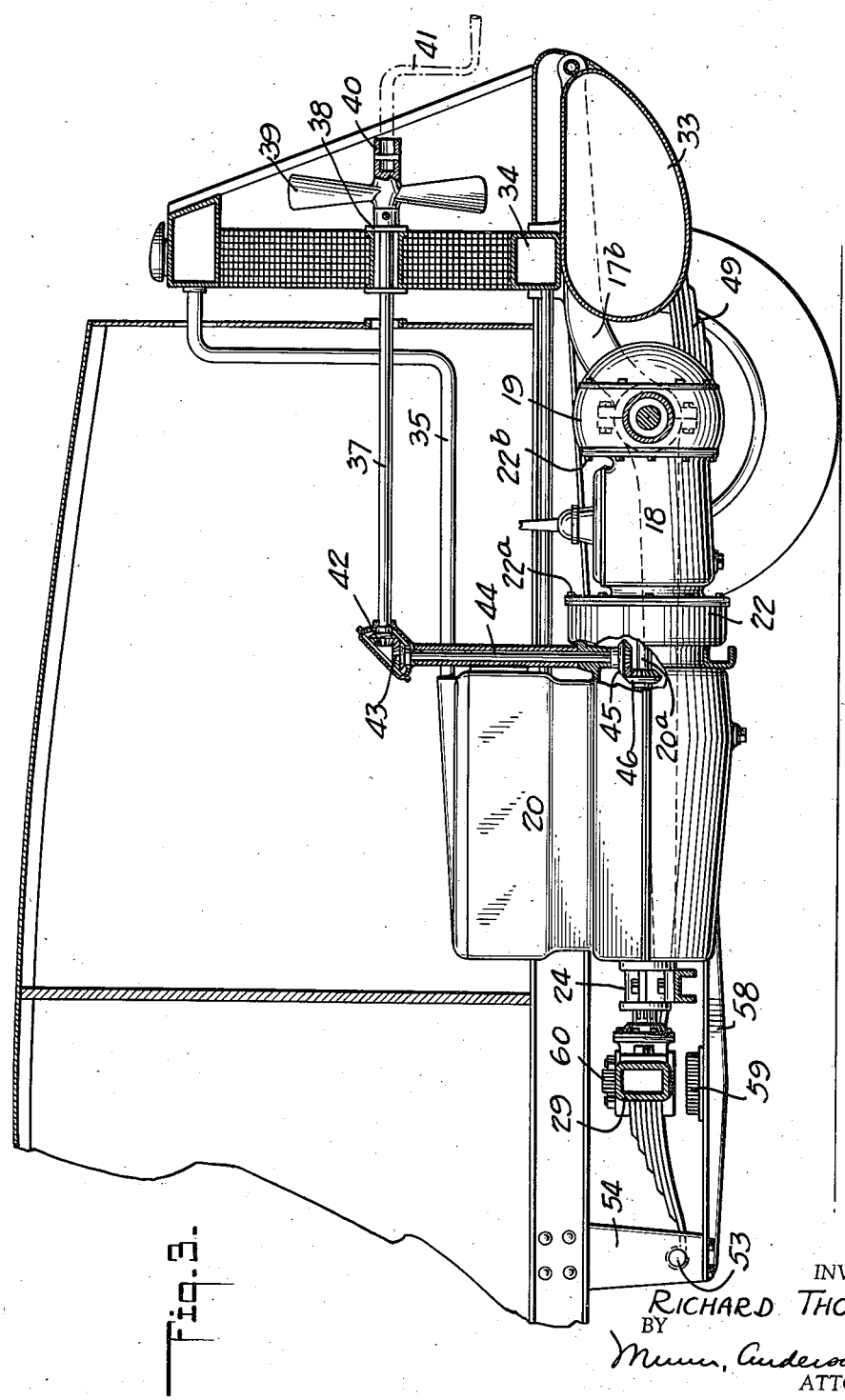
Fig. 3.
INVENTOR.
RICHARD THOMPSON
BY
ATTORNEYS.

Patented July 28, 1936

2,048,959

UNITED STATES PATENT OFFICE 2,048,959

POWER PLANT MOUNTING FOR VEHICLES

Richard Thompson, Los Angeles, Calif.

Application March 8, 1935, Serial No. 10,109

3 Claims. (Cl. 180—57)

This invention relates to a mounting for the power plant of an automotive vehicle.

The invention finds expression in a novel method of mounting the entire power plant assembly at the rear of a chassis, whereby the body of the vehicle may be streamlined in strict keeping with the science of aerodynamics, thus enabling greater speed to be attained and a material saving in fuel consumption effected.

While the invention is particularly useful in the environment aforementioned, it is a broad object of the invention to provide mounting means for the power plant which can be used to great advantage in combination with a body of any conventional design, that is to say, regardless of whether the body is or is not streamlined.

A still further object of the invention is to provide mounting means for the power plant assembly of an automotive vehicle which will contribute to the riding comfort to be had from its use by elimination of vibration which heretofore has been due to conditions which the present invention corrects.

An important object of the invention resides in the manner of directly coupling together the clutch, transmission and differential mechanisms of the system to avoid the use of long length drive shaft and universal joint connections between the differential and the clutch, as has been the practice heretofore.

Another object is to provide a mounting for the power plant by means of which the power plant can fulcrum on the rear axle housing and be self-compensatory to angular movements in the ordinary use of the invention.

A still further object is to provide a power plant mounting which will have great strength and be well suited to the work it is to serve and which will yieldingly absorb the shocks, loads and stresses imposed thereon.

A further object is to provide a novel and highly useful form of spring assembly which is coordinated with other mechanisms of the assembly and which will automatically compensate itself to all angular motions imparted to said mechanisms.

A still further object of the invention is to provide a mounting which can be easily installed upon a chassis of any well known construction.

Another object is to provide a movable mounting for a power plant which will also support the customary radiator for the circulation cooling medium for the cylinder jackets of the power plant.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the accompanying drawings:

Figure 3 is a longitudinal sectional view taken approximately on the line 3—3 of Figure 1;

Figure 4 is a transverse section taken on the line 4—4 of Figure 2;

Figure 5 is a section through a portion of the engine case showing the manner of hanging same from the rigid bar of the spring assembly; and Figure 6 is a transverse section taken on the line 6—6 of Figure 1.

Figure 1:
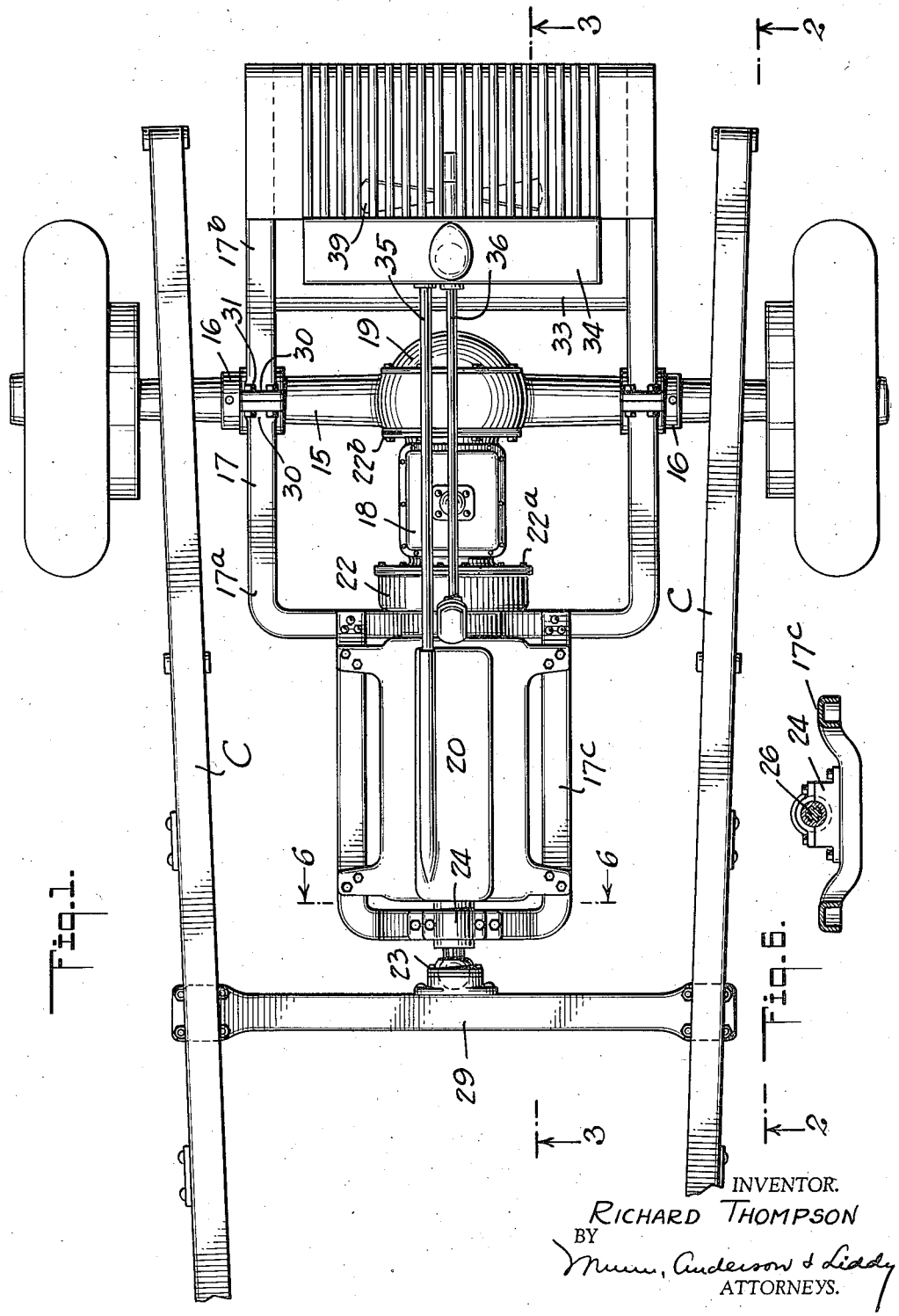
Figure 1 is a view in top plan of the invention showing same applied to such portion of a conventional chassis as is necessary to properly illustrate the invention.
Figure 2:
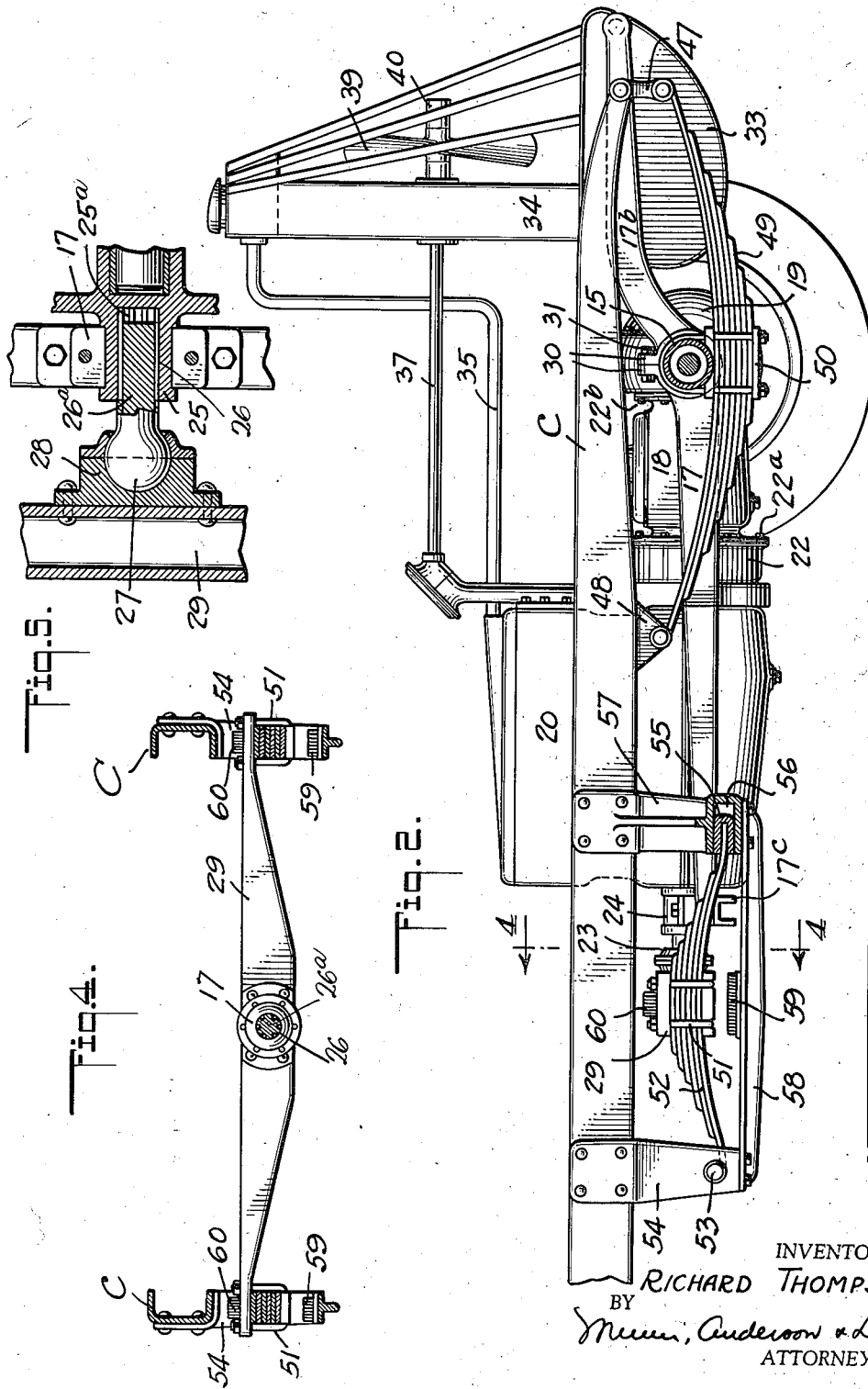
Figure 2 is a view in side elevation of the parts shown in Figure 1.

In carrying the invention into practice, use is made of a conventional chassis C, a rear axle housing 15 having the usual form of differential housing 19, an engine 20, an oscillative supporting frame 17 for the engine, transmission mechanism 18 and fly wheel and clutch case 22. The above named parts comprise the engine or power plant organization and except for the novel manner of mounting same on the chassis, to which may be added the new and novel manner of directly coupling the differential, the transmission and the clutch case, whereby to avoid the use of the heretofore long propeller shaft, said parts may, each and all of them, be of any suitable well known construction, and except for the manner in which they combine to the end that the functions in view can be satisfactorily attained, I make no claim to any of them.

The frame 17 consists of a forwardly disposed extension 17a, a rearwardly disposed extension 17b and a rectangular continuation 17c of the extension 17a, the same provided with a bearing 24 in which is received the tubular sleeve 25 at one end of the engine casing. It will suffice for the present to say that the sleeve 25 is provided with longitudinal keyways 25a which receive the keys 26 formed on the sliding stem 26a the latter carried by the ball 27, said ball being received in a complementary socket 28 secured to a vertically movable bar 29. It therefore follows that from the construction just described, the forward end of the frame 17 is adapted for universal movement.

The frame extensions 17a and 17b are formed with clamping yokes 30 bolted together as at 31 to embrace the rear axle housing 15. Movement of the frame longitudinally of the axle housing is prevented by the stop collars 16 on the housing 15 as will be understood on reference to Figure 1 of the drawings.

The extension 17b of frame 17 supports a fuel tank 33 and a radiator 34, the latter connected by the intake and return pipes 35 and 36 with the cooling jacket of engine 20. In view of this construction and arrangement of these parts, it follows that the fuel tank and the radiator are adapted to move as a unit with the frame 17. A driven shaft 37 is journaled in the radiator as shown at 38, and keyed to rotate therewith is a suction fan 39 to accelerate movement of air through the cooling tubes of the radiator. At its rear end, the shaft is provided with a socket 40 to receive a starter crank 41. Fixed to the forward end of the shaft is a miter gear pinion 42 in mesh with a similar gear pinion 43 on a shaft 44. At the lower end of the shaft 44 is a similar pinion 45 in mesh with pinion 46 on the crank shaft 20a of engine 20, whereby, when the engine is running, the fan 39 will be driven and a pull exerted upon the air to draw same through the radiator. In an emergency, the engine may be started by actuating the shaft 37 by the manually controlled crank 41.

Hung from the shackles 47 and the brackets 48 of the chassis are semi-elliptic leaf springs 49, the intermediate portions of which are attached by clips 50 to the rear axle housing, to which latter the frame 17 is mounted as aforestated.

The cross bar 29 is secured by clips to the intermediate portions of semi-elliptic springs 52. The forward ends of these springs are pivoted at 53 to brackets 54 which depend from the side bars of the chassis C. The rear ends of said springs are contained in slidable elements 55, the latter received in the guide and supporting saddles or channels 56 in the lower ends of brackets 57 which depend from the side bars of the chassis. The brackets 54 and 57 are disposed in longitudinal alinement with each other, and same are connected together by longitudinal rigid bars 58, the same having elastic buffers 59 to yieldingly retard downward movement of the springs 52. The springs are disposed directly beneath the side bars of the chassis and same are provided with elastic buffers 60 adapted to yieldingly contact the bars to retard upward movement of said springs. As the engine 20, clutch and flywheel casing 22, transmission 18, differential housing 19 and axle housing 15 are rigidly connected together, and as the frame structure 17, 17a, 17b and 17c is a rigid unit secured to the axle housing and supporting the engine, it follows that incident to road shocks the springs 49—49 and 52—52 will yield in a manner to effectively cushion the unitary structure composed of the aforestated elements, thus insuring such mechanism against damage.

As a result of the forward mounting of the unitary structure on the springs by the cross bar 29 and the splined universal connection, it will be manifest that all weaving, twisting and other strains imposed on the chassis will be compensated for in order not to injuriously affect the power plant and associated elements. Furthermore, the cross bar mounting on the springs uniformly distributes shocks therebetween for the bar functions as an equalizer. It will also be clear that the splined connection at the universal joint fully compensates for any lengthening or shortening of the distance between the rear axle and the ball of the universal joint incident to flexing of either the spring 49 or 52.

The method of mounting an engine as herein described is designed primarily, but not necessarily, for use in connection with the form of body construction disclosed in my co-pending application, Serial No. 10,108, executed as of even date herewith, in which application it is intended that the engine be disposed in the rear of the body and in a space or hood in which a current of air can constantly flow when the vehicle is propelled.

So far as I know, I am the first in the art to which the invention relates to mount the engine of an automotive vehicle in an underslung manner as herein provided for whereby to enable the engine to be employed in connection with a vehicle body adapted to conform more nearly to the laws of aerodynamics, that is to say, a method of mounting the engine in a position upon a conventional or suitable chassis to enable the front of the body to be made round and blunt and streamlined clear to the aft end or tail of the body. I make broad claim to this feature, along with the features which consist in the direct coupling to each other of the clutch transmission and differential units of the engine organization, whereby to eliminate the necessity of employing the well known forms of universal joints interposed in a long line of propeller shafting. And also so far as I know, it is entirely new in the art to yieldingly mount the entire engine organization to enable the units 18, 19 and 22 to be directly coupled together and the movements of the mounting automatically compensated for by the ball and socket connection between the yieldingly mounted bar 29 and the engine casing.

I shall claim in addition to the aforestated structurally and functionally novel feature the method of mounting an engine organization so as to include the radiator of the water cooling system of the engine and also, but not necessarily, the fuel supply tank.

While I have made incidental reference to a system or method of mounting an engine upon a chassis to enable the body to be correctly streamlined, this shall not be construed as limiting the invention, as it follows that both for the purpose of lowering the center of gravity and as a means to yieldingly mount the engine to reduce vibration, the several mechanisms used in combination as suggested can be employed to excellent advantage in connection with any well known construction of automotive vehicle. This is true of such parts of the total number of mechanisms employed that are capable of being used separately.

The forward end of the case for transmission 18 is rigidly bolted at 22a to the fly wheel and clutch case 22, the rear end of said transmission case being bolted at 22b to the front end of the differential housing 19, the three said mechanisms thus practically consisting of a rigid structure in which all said mechanisms are in longitudinal alinement, the power from the crank shaft of the engine being directly transmitted to the differential mechanism of the rear axle housing through the transmission rather than indirectly to said differential mechanism through the usual universally coupled long drive or propeller shaft which, as is well known, is ordinarily interposed between the transmission and the differential.

I claim:

1. The combination with a vehicle chassis including a spring mounted axle housing and a differential mechanism, of a unitary structure including a power plant and transmission mechanism; means for mounting one end of said unitary structure rigidly to the axle housing with the transmission and differential mechanisms operatively associated; a universal joint at the opposite end of said structure; springs carried by the chassis at opposite sides of said structure; a transverse equalizer member connecting said springs and medially to which one element of the universal joint is secured; and a splined connection between the other element of the universal joint and the unitary structure, whereby road shocks will be uniformly distributed between said springs by the equalizer member, and strains imposed on the chassis compensated for by the splined universal joint connection in order to prevent damage to said unitary structure.

2. The combination with a spring suspended axle housing of an automotive vehicle, of an engine mounting supported at one end by the housing and having a transmission operatively associated with the differential of the axle; and a hanger for the other end of the mounting; said hanger including springs carried by the chassis at opposite sides of the mounting; an equalizer member spanning the springs; and a splined universal joint connection between the equalizer member and said other end of the mounting.

3. The combination with a vehicle chassis having a spring suspended axle housing and differential mechanism; of a unitary structure composed of a power plant, clutch and transmission mechanism directly coupled to the differential mechanism; a supporting frame for said structure fixed to, and having portions extending forwardly and rearwardly of, said axle housing and to one portion of which the power plant is secured; means for spring suspending the free end of said one portion from the chassis while compensating for vertical movement of the axle housing; and a radiator for the cooling system of the power plant supported by the other portion of said frame in order to have a counterbalancing effect on the weight of said unitary structure.

RICHARD THOMPSON.